US011835090B2

(12) United States Patent
Yu

(10) Patent No.: US 11,835,090 B2
(45) Date of Patent: Dec. 5, 2023

(54) BEARING SEAL WITH POLYTETRAFLUOROETHYLENE THRUST BUMPER

(71) Applicant: Consolidated Metco, Inc., Vancouver, WA (US)

(72) Inventor: Xin Yu, Vancouver, WA (US)

(73) Assignee: CONSOLIDATED METCO, INC., Vancouver, WA (US)

( * ) Notice: Subject to any disclaimer, the term of this patent is extended or adjusted under 35 U.S.C. 154(b) by 674 days.

(21) Appl. No.: 16/378,173

(22) Filed: Apr. 8, 2019

(65) Prior Publication Data

US 2020/0102984 A1 Apr. 2, 2020

Related U.S. Application Data

(60) Provisional application No. 62/738,979, filed on Sep. 28, 2018.

(51) Int. Cl.
*F16C 33/20* (2006.01)

(52) U.S. Cl.
CPC ........ *F16C 33/201* (2013.01); *F16C 2326/02* (2013.01)

(58) Field of Classification Search
CPC ................ F16C 33/201; F16C 2326/02; F16C 33/7813; F16C 43/045; F16C 2208/32; F16C 2208/02
See application file for complete search history.

(56) References Cited

U.S. PATENT DOCUMENTS

| 3,761,099 A | 9/1973 | Hansson |
| 5,015,001 A | 5/1991 | Jay |
| 5,183,269 A * | 2/1993 | Black .................... F16J 15/3256 277/420 |
| 5,813,675 A | 9/1998 | Otto |
| 5,969,518 A * | 10/1999 | Merklein ............ F16C 33/7879 324/173 |
| 5,997,005 A | 12/1999 | Gold et al. |
| 7,461,846 B2 * | 12/2008 | Chitren ................ F16J 15/4478 277/411 |
| 8,141,882 B2 | 3/2012 | Wang et al. |
| 10,208,801 B1 * | 2/2019 | Wang ................... F16C 33/7886 |
| 2003/0201609 A1 * | 10/2003 | Hood .................... F16C 33/765 277/409 |
| 2007/0177834 A1 * | 8/2007 | Koyagi .................. F16C 33/78 384/448 |
| 2007/0211974 A1 * | 9/2007 | Toth ....................... F16J 15/326 384/448 |

(Continued)

FOREIGN PATENT DOCUMENTS

CN 1688834 A 10/2005

OTHER PUBLICATIONS

PCT/US2019/026344 International Search Report and Written Opinion dated Jun. 24, 2019, 7 pages.

(Continued)

*Primary Examiner* — Eugene G Byrd
(74) *Attorney, Agent, or Firm* — COZEN O'CONNOR

(57) ABSTRACT

A bearing seal includes a seal case, a sleeve, and a thrust bumper disposed between the seal case and the sleeve to define spacing between the seal case and the sleeve during assembly of a wheel end implementing the bearing seal. The thrust bumper includes polytetrafluoroethylene.

17 Claims, 12 Drawing Sheets

(56) References Cited

U.S. PATENT DOCUMENTS

| | | | | |
|---|---|---|---|---|
| 2009/0010581 | A1* | 1/2009 | Takahashi | B60B 27/0094 |
| | | | | 384/448 |
| 2009/0274404 | A1* | 11/2009 | Torii | F16C 41/007 |
| | | | | 384/448 |
| 2010/0219587 | A1* | 9/2010 | Wang | F16J 15/3264 |
| | | | | 277/411 |
| 2013/0243359 | A1* | 9/2013 | Shibata | F16J 15/3276 |
| | | | | 384/486 |
| 2014/0239597 | A1* | 8/2014 | White | B60B 27/0073 |
| | | | | 277/352 |
| 2015/0063734 | A1* | 3/2015 | Duch | F16C 33/782 |
| | | | | 384/446 |
| 2016/0003302 | A1* | 1/2016 | Seno | F16C 33/7886 |
| | | | | 277/351 |
| 2016/0245409 | A1* | 8/2016 | Kato | F16C 41/007 |
| 2018/0258995 | A1* | 9/2018 | Mitsuishi | F16C 19/186 |
| 2018/0370317 | A1* | 12/2018 | Takahashi | B60G 15/06 |

OTHER PUBLICATIONS

Chinese Patent Application No. 201980063627.2 First Office Action dated Jul. 22, 2022, 7 pages.
English Translation of Chinese Patent Application No. 201980063627.2 First Office Action dated Jul. 22, 2022, 7 pages.
Robert, D.C .; Garlock Klozure "*Extending Equipment Life through Improved Sealing Technology*", Power-Gen International, Dec. 11-13, 2007, 21 pages.

\* cited by examiner

BEARING SEAL WITH POLYTETRAFLUOROETHYLENE THRUST BUMPER

RELATED APPLICATIONS

This application claims priority to U.S. Patent Application No. 62/738,979 filed Sep. 28, 2018, which is incorporated herein by reference in its entirety.

BACKGROUND

Wheel bearings generally require a bearing seal that seals between the bearing and the external environment, to prevent contaminants from entering the bearing and to prevent or at least reduce loss of oil from the bearing. A part of the bearing seal is affixed to the rotating part of the wheel assembly (the hub), and another part of the bearing seal is affixed to the stationary part of the wheel assembly (the axle). Many seals form a labyrinth between the rotating and stationary seal parts to create an arduous leakage path between bearing and the external environment while minimizing friction between the rotating and stationary seal parts. Some seals are so called non-contact seals where the rotating part of the seal does not contact the stationary part of the seal. Contact seals are more common though. In a typical contact seal, one or more elastomers bridge between the rotating part of the seal and the non-rotating part of the seal to provide a physical barrier. An elastomer may also be molded onto one of the rotating and non-rotating parts to define the proper spacing between the rotating and non-rotating parts of the seal during assembly of a wheel end. This elastomer is an integral part of the seal and remains in place during subsequent operation of the wheel end.

SUMMARY

In an embodiment, a bearing seal includes a seal case, a sleeve, and a thrust bumper disposed between the seal case and the sleeve to define spacing between the seal case and the sleeve during assembly of a wheel end implementing the bearing seal. The thrust bumper includes polytetrafluoroethylene In an embodiment, a thrust bumper for a bearing seal includes a ring that includes polytetrafluoroethylene.

DETAILED DESCRIPTION OF THE EMBODIMENTS

Figure 1A:
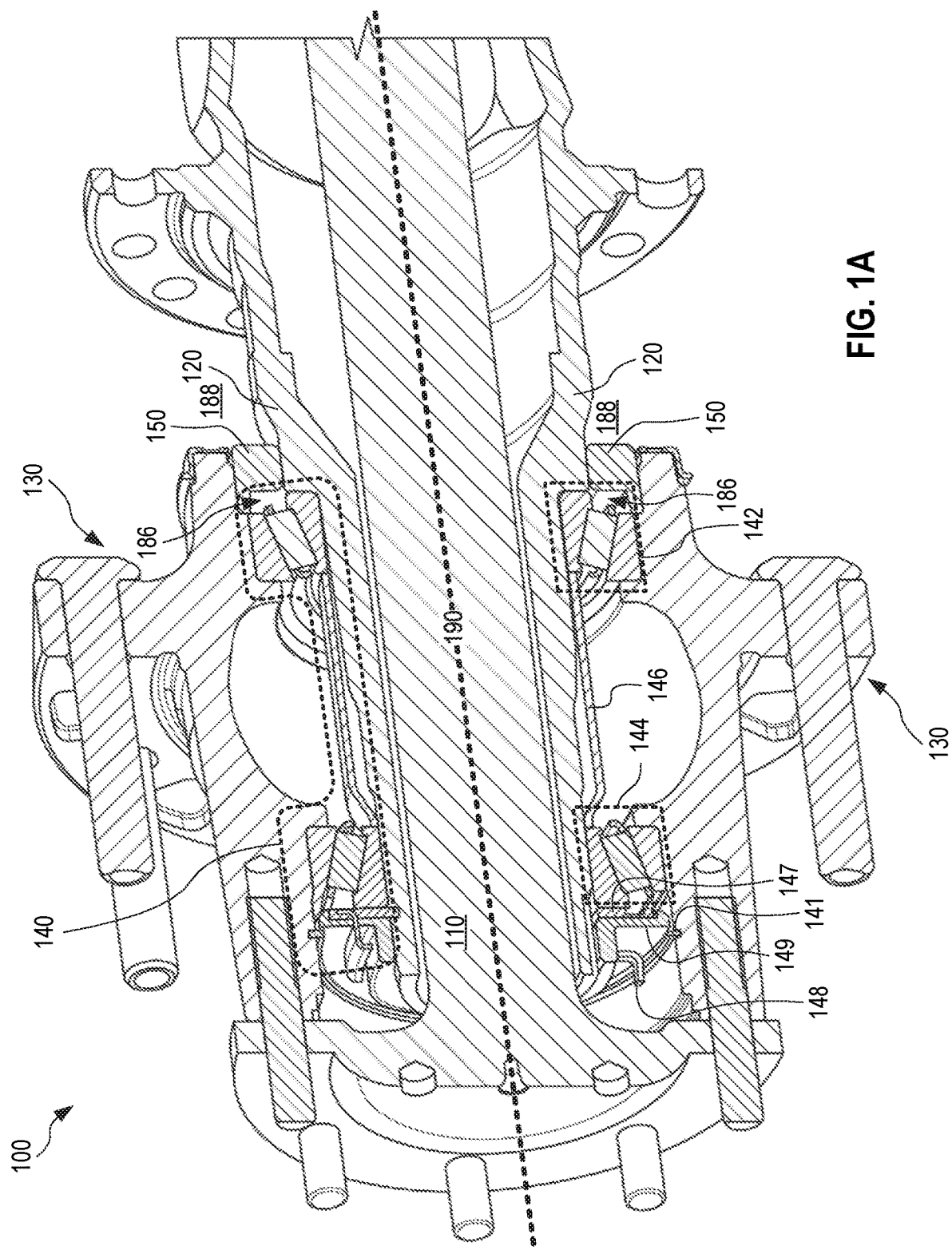
FIGS. 1A and 1B illustrate a drive wheel end of a vehicle, according to an embodiment.
Figure 1B:
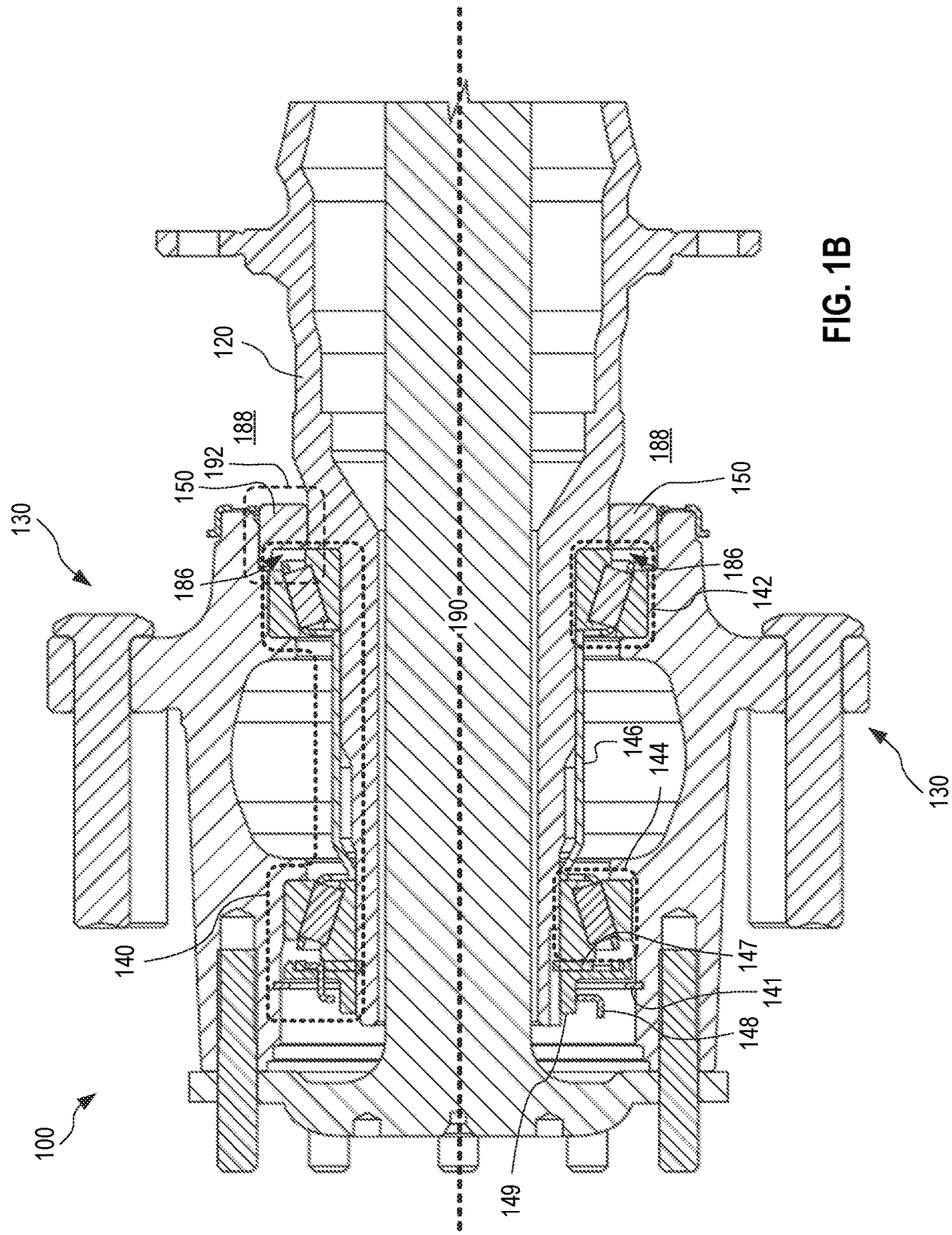

FIGS. 1A and 1B illustrate one drive wheel end 100 of a vehicle, such as a tractor. FIG. 1A is an isometric full-section view showing one half of drive wheel end 100. The section used in FIG. 1A contains the rotation axis 190 of drive wheel end 100. FIG. 1B is a cross-sectional view of drive wheel end 100, with the cross section containing rotation axis 190. FIGS. 1A and 1B are best viewed together in the following description. Drive wheel end 100 includes an axle shaft 110, and axle 120, a hub assembly 130, a bearing system 140, and a bearing seal 150. Hub assembly 130 is rigidly attached to axle shaft 110 and is configured to accommodate a wheel (not shown in FIGS. 1A and 1B) of the vehicle. Axle 120 supports at least part of the load of the vehicle. To engage drive wheel end 100, an engine rotates axle shaft 110 via a drive line, which causes hub assembly 130 to rotate about axle 120.

Bearing system 140 reduces friction between hub assembly 130 and axle 120. For this purpose, bearing system 140 includes an inboard bearing 142 and an outboard bearing 144. In one implementation, bearing system 140 further includes (a) a spacer 146 limiting endplay of inboard bearing 142 and outboard bearing 144, (b) a lock ring 148, a lock washer 147, and a spindle nut 149 secured to axle 120, and (c) a snap ring 141 secured to hub assembly 130. Spacer 146, lock ring 148, lock washer 147, spindle nut 149, and snap ring 141 cooperate to keep inboard bearing 142 and outboard bearing 144 properly positioned. Bearing system 140 requires lubrication, such as oil or grease, at inboard bearing 142, outboard bearing 144, and bearing seal 150 to achieve low-friction rotation of hub assembly 130 about axle 120. During operation, lubrication is provided along axle 120 and from hub assembly 130.

Bearing seal 150 seals an "oil side" 186, associated with bearing system 140 and its lubrication, from an "air side" 188 that is external to drive wheel end 100. Bearing seal 150 serves to prevent or at least reduce (a) loss of lubrication from oil side 186 to air side 188 and (b) penetration of contaminants (e.g., external fluids, particles, and/or dirt) from air side 188 to oil side 186 and into bearing system 140. Penetration of such contaminants into bearing system 140 may be detrimental to lubricant, increase friction, and cause damage in bearing system 140.

Figure 2:
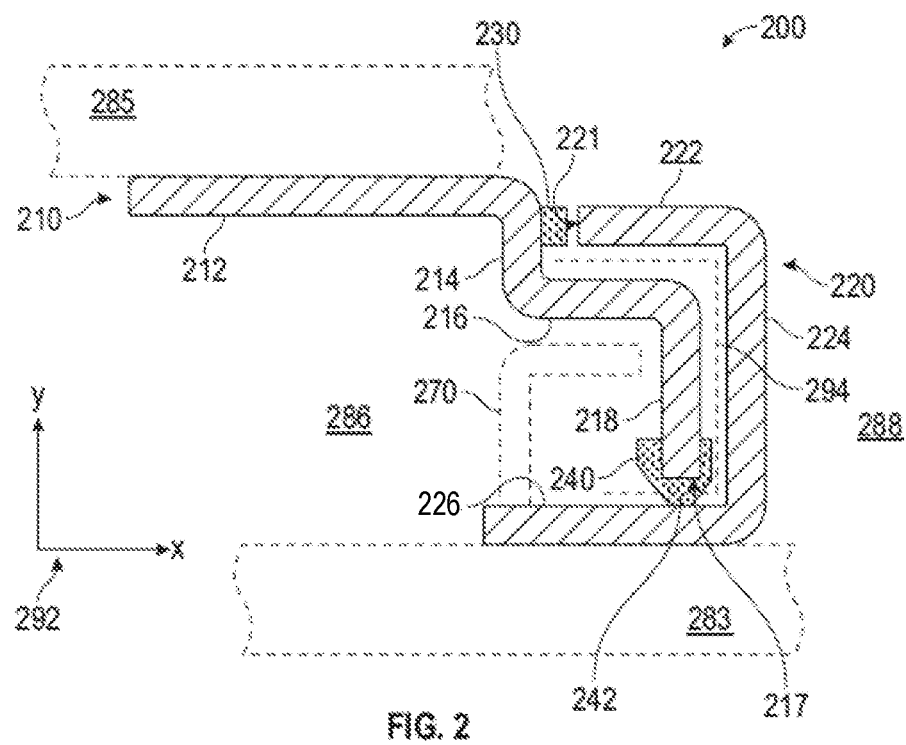
FIG. 2 illustrates a bearing seal with a polytetrafluoroethylene (PTFE) thrust bumper, according to an embodiment.

FIG. 2 illustrates one bearing seal 200 with a polytetrafluoroethylene (PTFE) thrust bumper 230. FIG. 2 depicts a cross section of bearing seal 200 similar to the view of bearing seal 150 in region 192 of FIG. 1B. Bearing seal 200 is an example of bearing seal 150 but may also be used in other types of wheel assemblies and/or to seal other types of bearings.

Bearing seal 200 includes a seal case 210, a sleeve 220, and thrust bumper 230. Each of seal case 210, sleeve 220, and thrust bumper 230 encircles the rotation axis of bearing seal 200 (e.g., rotation axis 190, FIGS. 1A and 1B). The x-axis of coordinate system 292, depicted in FIG. 2, is parallel to the rotation axis. The y-axis of coordinate system 292 is perpendicular to the rotation axis. Sleeve 220 is rotatable, relative to seal case 210, about the rotation axis of bearing seal 200. In actual use, seal case 210 may be affixed to a hub 285 (e.g., hub assembly 130), and sleeve 220 may be affixed to an axle 283 (e.g., axle 120). Seal case 210 and sleeve 220 are a distance apart from each other to form a labyrinth path 294 from an oil side 286 of bearing seal 200 to an air side 288 of bearing seal 200. Bearing seal 200 may include one or more elastomers bridging across labyrinth path 294 between seal case 210 and sleeve 220, for example the elastomer 240 depicted in FIG. 2. Elastomer 240 encircles the rotation axis, is affixed to a radially innermost edge 217 of seal case 210, and forms a lip 242 that contacts an innermost axial leg 226 of sleeve 220.

Herein, "radial" refers to the dimensions orthogonal to the rotation axis (parallel to the y-axis of coordinate system 292), "axial" refers to the dimension parallel to the rotation axis (parallel to the x-axis of coordinate system 292), "radial leg" refers to a leg with a predominantly radial orientation, and "axial leg" refers to a leg with a predominantly axial orientation.

Thrust bumper 230 is disposed between seal case 210 and sleeve 220. Thrust bumper 230 defines the spacing between seal case 210 and sleeve 220 during assembly of a wheel end, e.g., drive wheel end 100, that implements bearing seal 200. During such assembly, seal case 210 and sleeve 220 are compressed together, with thrust bumper 230 sandwiched therebetween to set the proper spacing between seal case 210 and sleeve 220. In a break-in phase, during initial operation of the wheel end, thrust bumper 230 will be worn, and a gap will open at thrust bumper 230.

In one embodiment, thrust bumper 230 is mounted to seal case 210, such that thrust bumper 230 rotates relative to sleeve 220 during operation of the wheel end. In this embodiment, sleeve 220 wears off a layer of thrust bumper 230 during the break-in phase, thereby opening up a gap between thrust bumper 230 and sleeve 220, for example as depicted in FIG. 2. In an alternative embodiment, thrust bumper 230 is instead mounted to sleeve 220, such that the break-in phase opens a gap between thrust bumper 230 and seal case 210. The following discussion of FIG. 2 assumes that thrust bumper 230 is mounted to seal case 210, such that thrust bumper 230 rotates relative to sleeve 220.

During the break-in phase, at least initially, the friction between sleeve 220 and thrust bumper 230 results in a temperature increase of both thrust bumper 230 and sleeve 220 at the interface therebetween. At this interface, sleeve 220 may be metal and can therefore withstand high temperatures. Metal is not a suitable choice for the material of thrust bumper 230. A direct metal-against-metal interface between the seal case and the sleeve would likely results in (a) high friction and/or (b) generation of metal debris. High friction would counter-act the benefits of using a bearing system, and metal debris could damage both the seal and the bearing(s) protected by the seal. In conventional bearing seals, an elastomer sets the spacing between the seal case and the sleeve. This elastomer bridges between the seal case and the sleeve throughout operation of the bearing seal, not only during a break-in phase. Although the friction between the elastomer and the metal (of either the seal case or the sleeve) is less than the friction that would exist between two metal parts, the friction between the elastomer and the metal is non-negligible and persists throughout the life of the bearing seal. Furthermore, we have found that the elastomer may be worn off or shredded in high axial load conditions, and the resulting debris can cause failure of the bearing seal.

One prior-art bearing seal improves on this issue by instead implementing a nylon 6-6 bumper that thins during the break-in phase to open a gap, such that the nylon 6-6 bumper does not produce any significant friction in post-break-in operation of the seal. However, we have found that the break-in phase of this prior-art seal produces temperatures of the nylon 6-6 bumper in excess of its glass transition (melting) temperature. Specifically, we have measured that at least portions of the nylon 6-6 bumper typically reaches 400 degrees Fahrenheit, and sometimes as much as 600 degrees Fahrenheit. The glass transition temperature of nylon 6-6 is 180 degrees Fahrenheit, and at least a portion of the nylon 6-6 bumper therefore melts during break-in. Not only may such melting distort the shape of the nylon 6-6 bumper, but nylon 6-6 becomes brittle when resolidified. We have found that the resolidified nylon 6-6 bumper in many cases shatters during subsequent use. Through inspection of failed bearing seals, we have found that about 60 percent of failures of this particular prior-art seal are due to splinters from the shattered nylon 6-6 bumper destroying rubber features critical to the sealing capabilities of the seal. This type of failure is particularly common for bearing seals having a relatively large diameter. We have observed a significantly higher failure rate for bearing seals (with the nylon 6-6 bumper) when the outer diameter is about 5 inches or more. In lab testing of such large-diameter bearing seals, we have observed sporadic temperature spikes when operating at beyond 500 revolutions per minute (rpm) which is equivalent to a travel speed of approximately 60 miles per hour for a truck configured with the bearing seal.

We set out to find a more suitable thrust bumper material having a higher glass transition temperature than nylon 6-6. It is difficult (if not impossible) to fully understand how a material performs, and possibly fails, without testing the material in its intended use scenario. Thus, ideally, a large number of different bearing seals using different candidate materials for the thrust bumper would be manufactured and tested to determine which material performs the best over extended use. However, there are countless polymers and polymer-based materials with higher glass transition temperatures than nylon 6-6, and such large scale testing is not feasible for many different material types. Consider that each type of material must be sourced, bearing seals must be manufactured using this material for the thrust bumper using design and manufacturing process parameters specific to that material, and those bearing seals must then undergo long performance tests. Given the complexity and resource demands of testing, there are far too many candidate materials to test all options or even a representative selection.

Thus, we carefully selected a smaller number of candidate materials having higher glass transition temperatures than nylon 6-6. In this test we included relative hard and wear-resistant materials, for example polyaryletherketone (PAEK) and polyether ether ketone (PEEK), since we expected that hard and wear-resistant materials would perform the best. Surprisingly and counter-intuitively, we found that PTFE and PTFE-based materials, which are far softer than, e.g., PAEK and PEEK, performed better in terms of life of the bearing seal. We even found that pure PTFE performed better than PTFE with hardening additives. Herein, "life" of a bearing seal refers to the duration of use before failure of the bearing seal. Test results are discussed in further detail below in reference to FIGS. 14-17.

Due to the surprising outcome of our testing, thrust bumper 230 includes PTFE. Thrust bumper 230 may be composed entirely of PTFE. Alternatively, thrust bumper 230 is a mixture of PTFE and one or more additives, such as one or more of carbon fiber, graphite, glass fiber, and molybdenum disulfide. The mixture may be uniform throughout thrust bumper 230. The additives may reinforce thrust bumper 230 and increase its wear-resistance. However, the additives may also decrease the maximum elongation of thrust bumper 230, thereby making thrust bumper 230 more brittle. In an embodiment, the maximum elongation of thrust bumper 230 is at least 50% at room temperature or at twenty degrees Celsius. Pure PTFE has a maximum elongation of approximately 300% at twenty degrees Celsius.

In one class of embodiments, thrust bumper 230 includes between 80% and 90% PTFE with the remaining part of the mixture consisting of one or two of carbon fiber, glass fiber, and molybdenum disulfide. However, we have observed superior performance when thrust bumper 230 is pure PTFE, or a mixture that is at least 90% PTFE. Herein, the contribution of a substance to a composition or mixture, indicated in percentage points, refers to the weight percentage of that substance. Accordingly, one embodiment of thrust bumper 230 is pure PTFE, whereas, in certain other embodiments, thrust bumper 230 has at least 90% PTFE. In these other embodiments, thrust bumper 230 may further contain one or more of carbon fiber, graphite, glass fiber, and molybdenum disulfide. Based on our testing results, it may be advantageous to keep the contribution of each specific additive to 5% or less. The glass transition temperature of pure PTFE is 620 degrees Fahrenheit. In our testing, we have found that the temperature of a pure PTFE thrust bumper 230 stays below 400 degrees Fahrenheit throughout the break-in phase. For comparison, higher peak temperature are reached for embodiments of thrust bumper 230 that are only 90% or less PTFE and include one or more of the above-mentioned additives. In some cases, the peak temperature approaches or exceeds 620 degrees Fahrenheit for short periods of time.

PTFE has a low friction coefficient. However, after breaking in thrust bumper 230, a gap exists between thrust bumper 230 and sleeve 220, such that thrust bumper 230's contribution to friction is nominally zero regardless of the material of thrust bumper 230. It turns out, however, that the low friction coefficient of the material of thrust bumper 230 does have a positive effect even after break-in of thrust bumper 230. This positive effect is related to the debris formed when wearing off some of thrust bumper 230 during the break-in phase. In our testing, we have observed that the debris, generated when breaking in thrust bumper 230, is a very fine powder or a flaky substance. Yet, due to the low-friction properties of PTFE, the debris is not abrasive. In fact, unexpectedly, the debris may even assist lubrication.

In the embodiment depicted in FIG. 2, sleeve 220 includes an outer axial leg 222, innermost axial leg 226, and a radial leg 224 that connects outer axial leg 222 to innermost axial leg 226. Outer axial leg 222 and innermost axial leg 226 may be parallel to the rotation axis, and radial leg 224 may be orthogonal to the rotation axis. Also in the embodiment depicted in FIG. 2, seal case 210 includes an outermost axial leg 212, an axial leg 216, a radial leg 214 connecting outermost axial leg 212 to axial leg 216, and a radial leg 218 extending radially inwards from the end of axial leg 216 opposite radial leg 214. Without departing from the scope hereof, seal case 210 and/or sleeve 220 may include one or more additional legs, and/or one or more of the legs depicted in FIG. 2 may have one or more additional kinks not depicted in FIG. 2. In the FIG. 2 embodiment, thrust bumper 230 is disposed on radial leg 214 of seal case 210 adjacent the terminal edge 221 of outer axial leg 222 of sleeve 220. Without departing from the scope hereof, thrust bumper 230 may be positioned at a different location between seal case 210 and sleeve 220. It may be advantageous, though, to position thrust bumper 230 in a location that, along labyrinth path 294, is between air side 288 and any elastomer lips (e.g., lip 242) of bearing seal 200, such that the presence of thrust bumper 230 helps prevent that contaminants from air side 288 reach and potentially damage such elastomer lips.

Bearing seal 200 may have over-molded rubber features not depicted in FIG. 2, without departing from the scope hereof. For example, a ribbed rubber section may be over-molded onto outermost axial leg 212 to engage with hub 285, and another ribbed rubber section may be over-molded onto innermost axial leg 226 to engage with axle 283. Each of seal case 210 and sleeve 220 may include or be composed of metal. Seal case 210 and 220 may be spin-formed or stamped.

It is understood that thrust bumper 230 may be provided as a standalone thrust bumper configured for implementation in a third party bearing seal.

Figure 3:
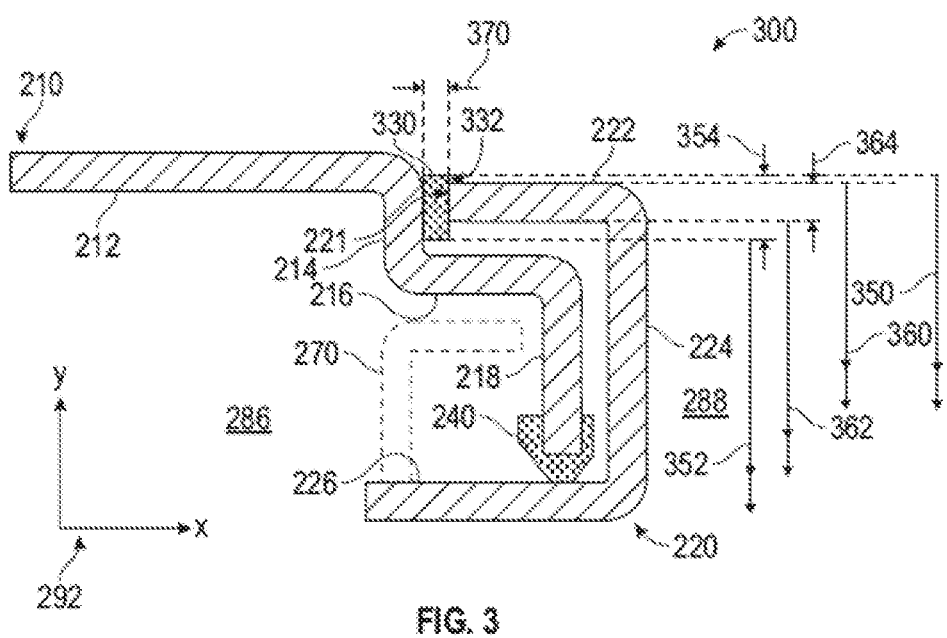
FIG. 3 illustrates a bearing seal with a PTFE thrust bumper characterized by a rectangular cross section and a larger radial width than the corresponding terminal edge of a sleeve, according to an embodiment.
Figure 4:
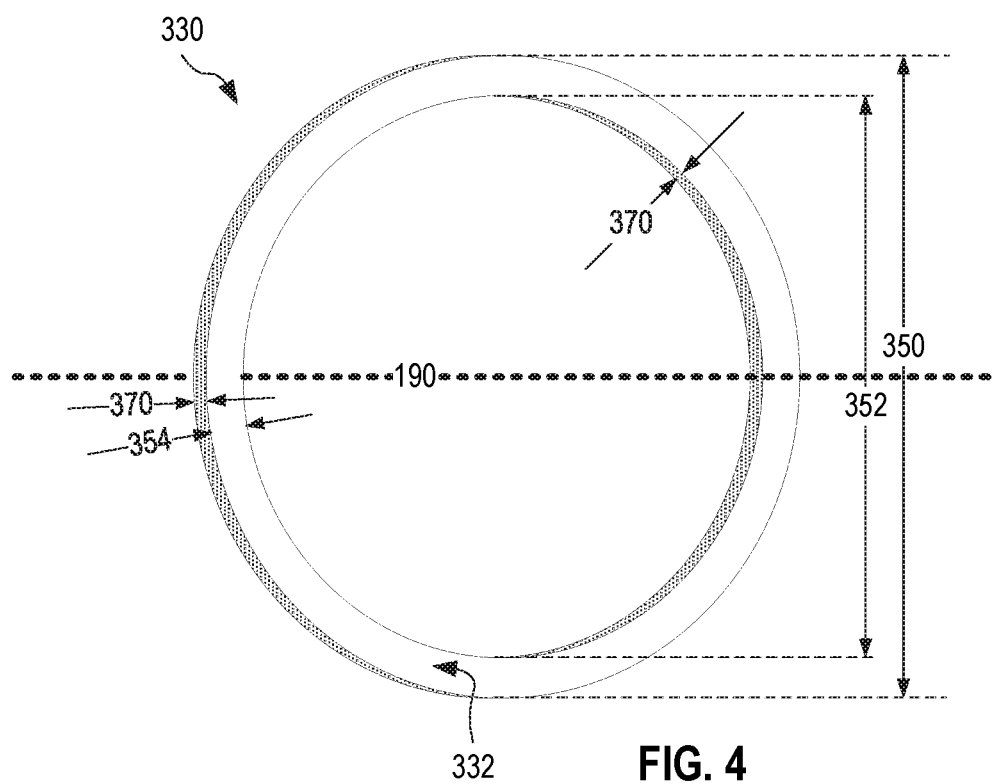
FIG. 4 shows the thrust bumper of FIG. 3 in perspective view.

FIG. 3 illustrates one bearing seal 300 with a PTFE thrust bumper 330 characterized by a rectangular cross section and a larger radial width than the corresponding terminal edge 221 of sleeve 220. FIG. 3 depicts a cross section of bearing seal 300 in a view similar to the view of bearing seal 200 in FIG. 2, except that FIG. 3 depicts the shape of thrust bumper 330 prior to break in, such that terminal edge 221 directly contacts a surface 332 of thrust bumper 330. FIG. 4 shows thrust bumper 330 in perspective view. FIGS. 3 and 4 are best viewed together in the following description. Bearing seal 300 is an embodiment of bearing seal 200.

Thrust bumper 330 has a radial width 354 between an inner diameter 352 and an outer diameter 350. Terminal edge 221 of outer axial leg 222 has a radial width 364 between an inner diameter 362 and an outer diameter 360. In FIG. 3, diameters are indicated as double arrows; each diameter extends beyond the view of FIG. 3. Thrust bumper 330 and terminal edge 221 are concentric. Inner diameter 352 is smaller than inner diameter 362, and outer diameter 350 is greater than outer diameter 360, such that radial width 354 encompasses and exceeds radial width 364.

Thrust bumper 330 has an axial thickness 370. Before break-in, surface 332 is planar throughout radial width 354. In an alternative embodiment (not depicted in FIG. 3), surface 332 is non-planar in at least one region, outside radial width 364, that does not interface with terminal edge 221. Terminal edge 221 may be planar and parallel to surface 332 (before break-in). Also before break-in, the cross section of thrust bumper 330, when viewed along the azimuthal dimension, is rectangular, as defined by radial width 354 and axial thickness 370.

In one embodiment, outer diameters 350 and 360 are in the range between 80 and 200 millimeters, radial width 354 is in the range between 3 and 10 percent of outer diameter 350, and radial width 364 is between 30 and 90 percent of radial width 354. Axial thickness 370 may be between 10 and 50 percent of radial width 364. In one example, axial thickness 370 is between 0.8 and 2.0 millimeters.

Figure 5:
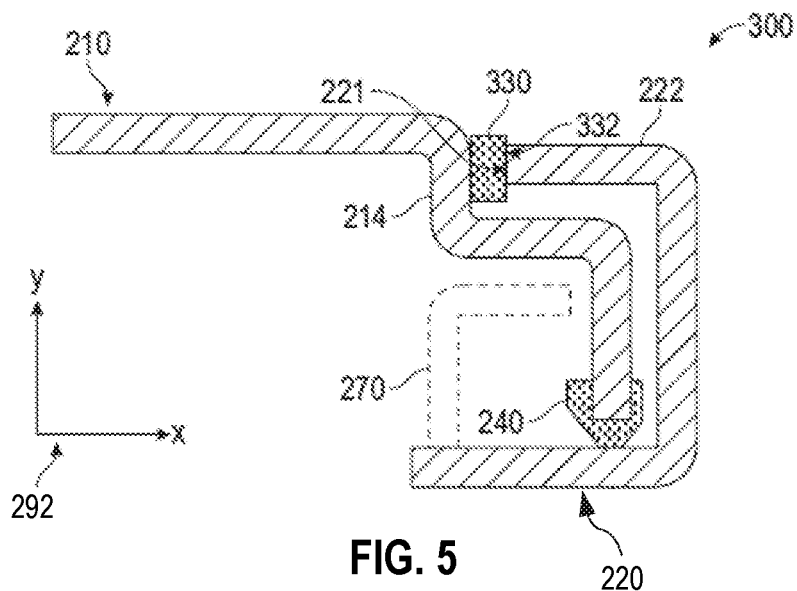
FIG. 5 shows a configuration of the bearing seal of FIG. 3 and its thrust bumper prior to break-in, according to an embodiment.
Figure 6:
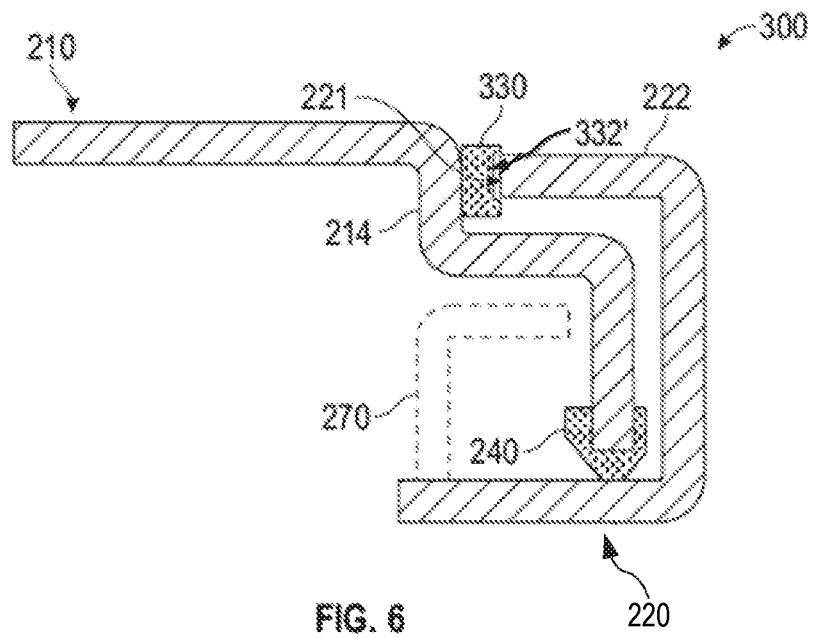
FIG. 6 shows a configuration of the bearing seal of FIG. 3 and its thrust bumper after break-in, according to an embodiment.
Figure 7:
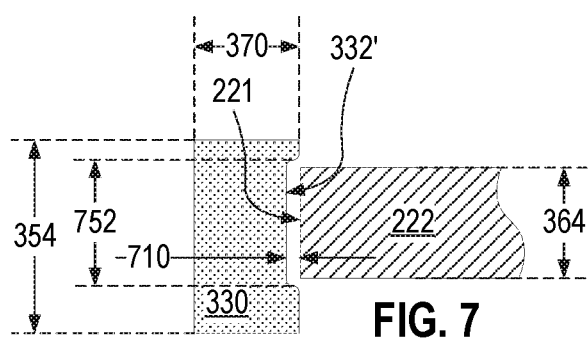
FIG. 7 is a close up of a portion of FIG. 6.

FIGS. 5, 6, and 7 show one effect of the break-in phase on thrust bumper 330. FIG. 5 depicts the configuration of bearing seal 300 and thrust bumper 330 prior to break-in, in a cross section view similar to that of FIG. 3. FIG. 6 depicts the configuration of bearing seal 300 and thrust bumper 330 after break-in, in a cross section view similar to that of FIG. 3. FIG. 7 is a close-up of FIG. 6, showing thrust bumper 330 and terminal edge 221 after break-in. FIGS. 5, 6, and 7 are best viewed together in the following description.

Prior to break-in, terminal edge 221 is butted up against surface 332 (see FIG. 5). During break-in, terminal edge 221 wears off some material from thrust bumper 330, and surface 332 is modified to a surface 332' that has a groove worn by terminal edge 221 (see FIGS. 6 and 7). The groove has radial width 752, which is smaller than radial width 354. Within the groove, the axial thickness of thrust bumper 330 is less than axial thickness 370. Radial width 752 encompasses radial width 364 and may exceed radial width 364 by a small amount. The groove in surface 332' has depth 710, such that a gap of depth 710 exists between thrust bumper 330 and terminal edge 221 after break-in. Depth 710 may be in the range between 0.05 and 1.0 millimeters. Depth 710 may be greater for embodiments of thrust bumper 330 composed purely of PTFE than for embodiments of thrust bumper 330 that further includes additives (as discussed above).

Figure 8:
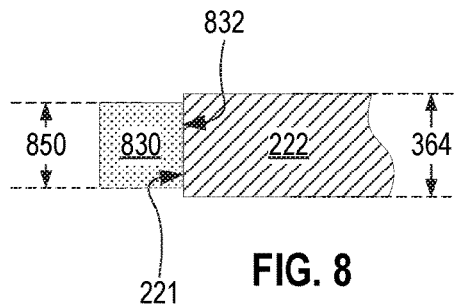
FIG. 8 illustrates a PTFE thrust bumper having a radial width that is no greater than the radial width of the terminal edge of the sleeve, according to an embodiment.

FIG. 8 illustrates one PTFE thrust bumper 830 having a radial width 850 that is no greater than the radial width 364 of terminal edge 221 of sleeve 220. FIG. 8 shows thrust bumper 830 in a view similar to that of FIG. 7, except that FIG. 8 depicts thrust bumper 830 prior to break-in. Thrust bumper 830 is similar to thrust bumper 330 apart from having a smaller radial width. Although FIG. 8 depicts thrust bumper 830 as having radial width 850 less than radial width 364, radial width 850 may be aligned with and identical to radial width 364. Thrust bumper 830 is an embodiment of thrust bumper 230. During break-in, terminal edge 221 wears a surface 832 to thin thrust bumper 830, throughout radial width 850, and thus open up a gap between thrust bumper 830 and terminal edge 221.

Figure 9:
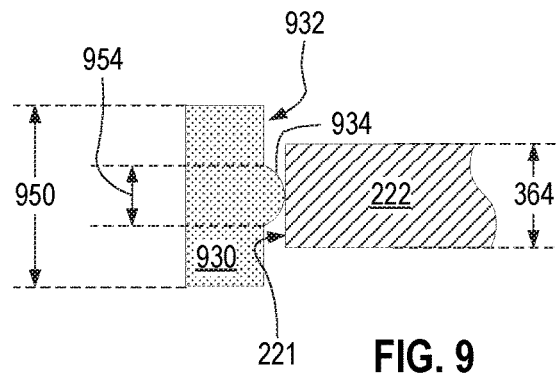
FIG. 9 illustrates a PTFE thrust bumper having a ridge that protrudes toward the terminal edge of the sleeve from an otherwise planar surface, according to an embodiment.

FIG. 9 illustrates one PTFE thrust bumper 930 having a ridge 934 that protrudes toward terminal edge 221 from an otherwise planar surface 932. FIG. 9 shows thrust bumper 930 in a view similar to that of FIG. 8. Thrust bumper 930 is an embodiment of thrust bumper 230. In one embodiment, ridge 934 encircles the rotation axis of thrust bumper 930. In another embodiment, ridge 934 is a series of bumps disposed about the rotation axis. Ridge 934 has radial width 954, which is less than radial width 364. The full radial width 950 of thrust bumper 930 exceeds radial width 364.

Ridge 934 may facilitate quicker break-in and less debris formation during break-in, as compared to thrust bumper 330, since less material must be worn away to achieve a certain distance between terminal edge 221 and thrust bumper 930. However, due to the amount of PTFE in thrust bumper 930 (and other embodiments of thrust bumper 230), it is generally not possible to injection-mold thrust bumper 930 (or other embodiments of thrust bumper 230), and the simpler shape of thrust bumpers 330 and 830, having a rectangular cross section and planar surface 332, is typically significantly cheaper to manufacture. In our testing, we have found that (a) the soft nature of the PTFE-based composition of thrust bumper 230 ensures quick break-in, regardless of the exact shape of the thrust bumper, and (b) the debris has been found to not have a negative effect on the bearing seal (as discussed above in reference to FIG. 2). Thus, the benefit of even quicker break-in and less debris generation achieved with thrust bumper 930 may be less significant than the benefit of simple and cheap manufacture of, e.g., thrust bumpers 330 or 830.

Figure 10:
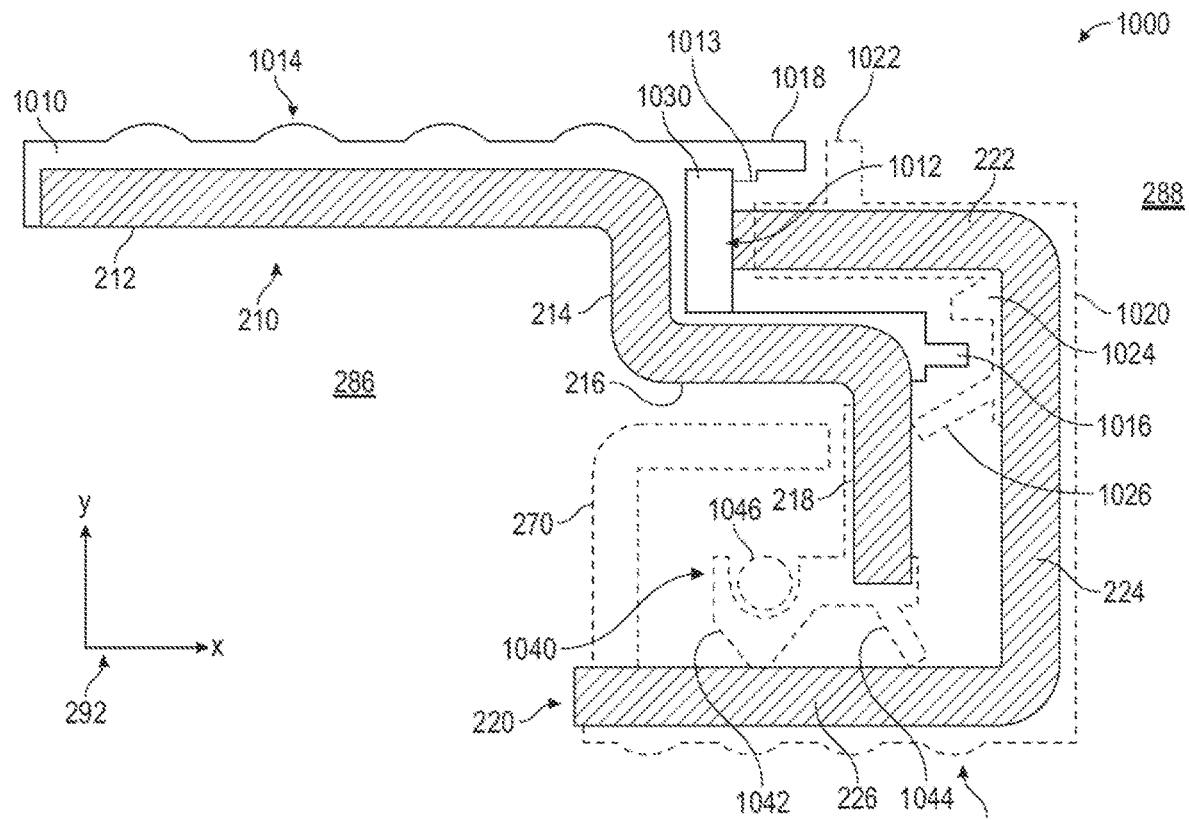
FIG. 10 illustrates a bearing seal implementing a PTFE thrust bumper seated in a rubber gasket over-molded onto a seal case, according to an embodiment.

FIG. 10 illustrates one bearing seal 1000 implementing a PTFE thrust bumper 1030 seated in a rubber gasket 1010 over-molded onto seal case 210. Bearing seal 1000 is an embodiment of bearing seal 200. Thrust bumper 1030 is thrust bumper 330 or 930. Rubber gasket 1010 is over-molded onto at least radial leg 214 and outermost axial leg 212 of seal case 210. Rubber gasket 1010 forms a receptacle 1012 for accommodating thrust bumper 1030. Receptacle 1012 may include a lip 1013 that secures thrust bumper 1030 in receptacle 1012.

Rubber gasket 1010 may, but need not, further form one, two, or all of a ribbed section 1014, an axial lip 1016, and a flange 1018. Ribbed section 1014 is configured to engage with a hub, e.g., hub 285, to form a static seal between seal case 210 and the hub. Axial lip 1016 protrudes into the labyrinth path between seal case 210 and sleeve 220. Axial lip 1016 may cooperate with one or more rubber features over-molded onto sleeve 220 to make flow through the labyrinth path more arduous and/or to form a contact seal in bearing seal 1000. For example, as depicted in FIG. 10, axial lip 1016 may cooperate in this manner with features 1024 and 1026 over-molded onto sleeve 220. In one embodiment, at axial lip 1016, feature 1024 (if included), and/or feature 1026 (if included) bridges between seal case 210 and sleeve 220 to form a contact seal of bearing seal 1000. In another embodiment, axial lip 1016, feature 1024 (if included), and feature 1026 (if included) do not form a bridge between seal case 210 and sleeve 220, but yet adds complexity to the labyrinth path to make flow through the labyrinth path more arduous. Flange 1018 may serve to extend the labyrinth path between seal case 210 and sleeve 220 and/or protect thrust bumper 1030.

Bearing seal 1000 may also include an elastomer 1040, an embodiment of elastomer 240, that forms a lip 1042 bridging from radial leg 218 to innermost axial leg 226. Lip 1042 thus forms a contact seal of bearing seal 1000. Optionally, bearing seal 1000 includes a spring 1046, encircling rotation the rotation axis of bearing seal 1000, that helps maintain pressure of lip 1042 onto innermost axial leg 226. Elastomer 1040 may further form a secondary radial lip 1044. In one implementation, radial lip 1044 bridges from radial leg 218 to innermost axial leg 226. In another implementation, radial lip 1044 does not extend all the way to innermost axial leg 226. Secondary radial lip 1044 may help protect the contact seal formed by lip 1042 from contaminants entering bearing seal 1000 from air side 288.

In an embodiment, bearing seal 1000 further includes a rubber gasket 1020 over-molded onto the side of sleeve 220 facing away from seal case 210. Rubber gasket 1020 may include one or both of a flange 1022 and a ribbed section 1028. Flange 1022 is configured to cooperate with flange 1018 to extend the labyrinth path between seal case 210 and sleeve 220 and/or protect thrust bumper 1030. Ribbed section 1028 is configured to engage with an axle, e.g., axle 283, to form a static seal between seal case 210 and the axle.

Figure 11:
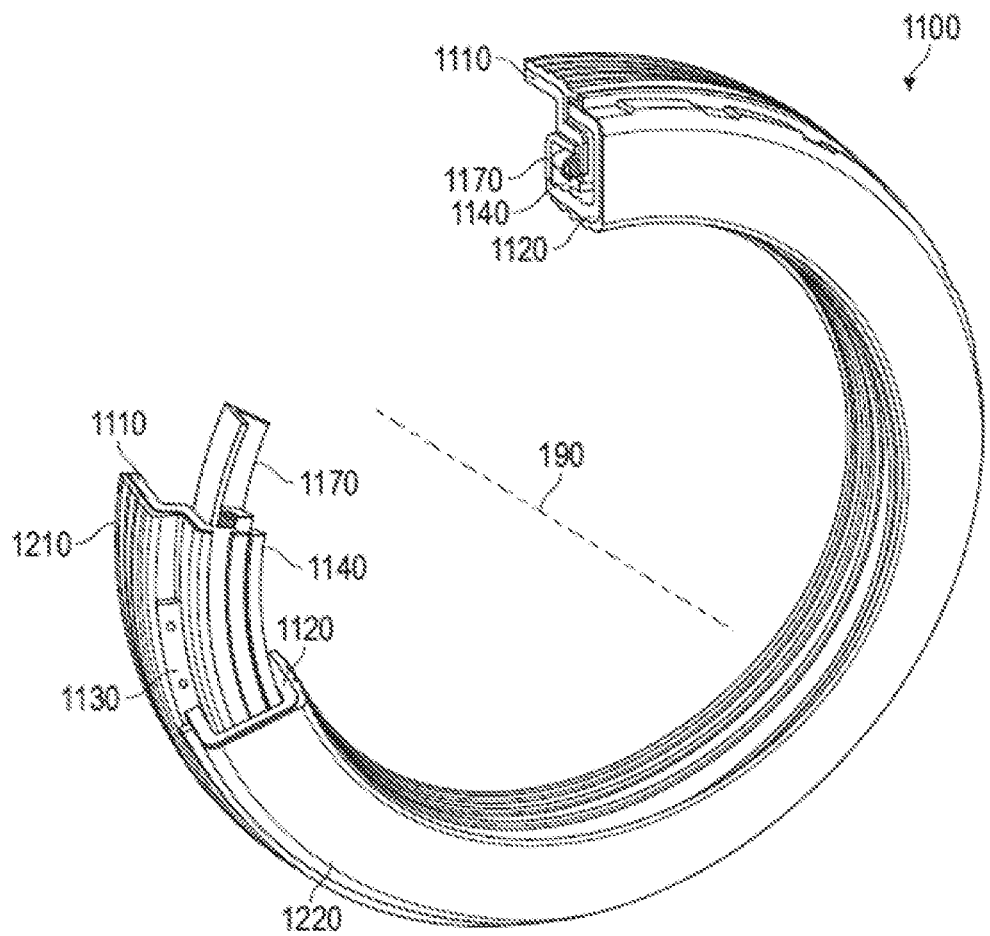
FIGS. 11 and 12 illustrate a bearing seal having a PTFE thrust bumper and several over-molded rubber features, according to an embodiment.
Figure 12:
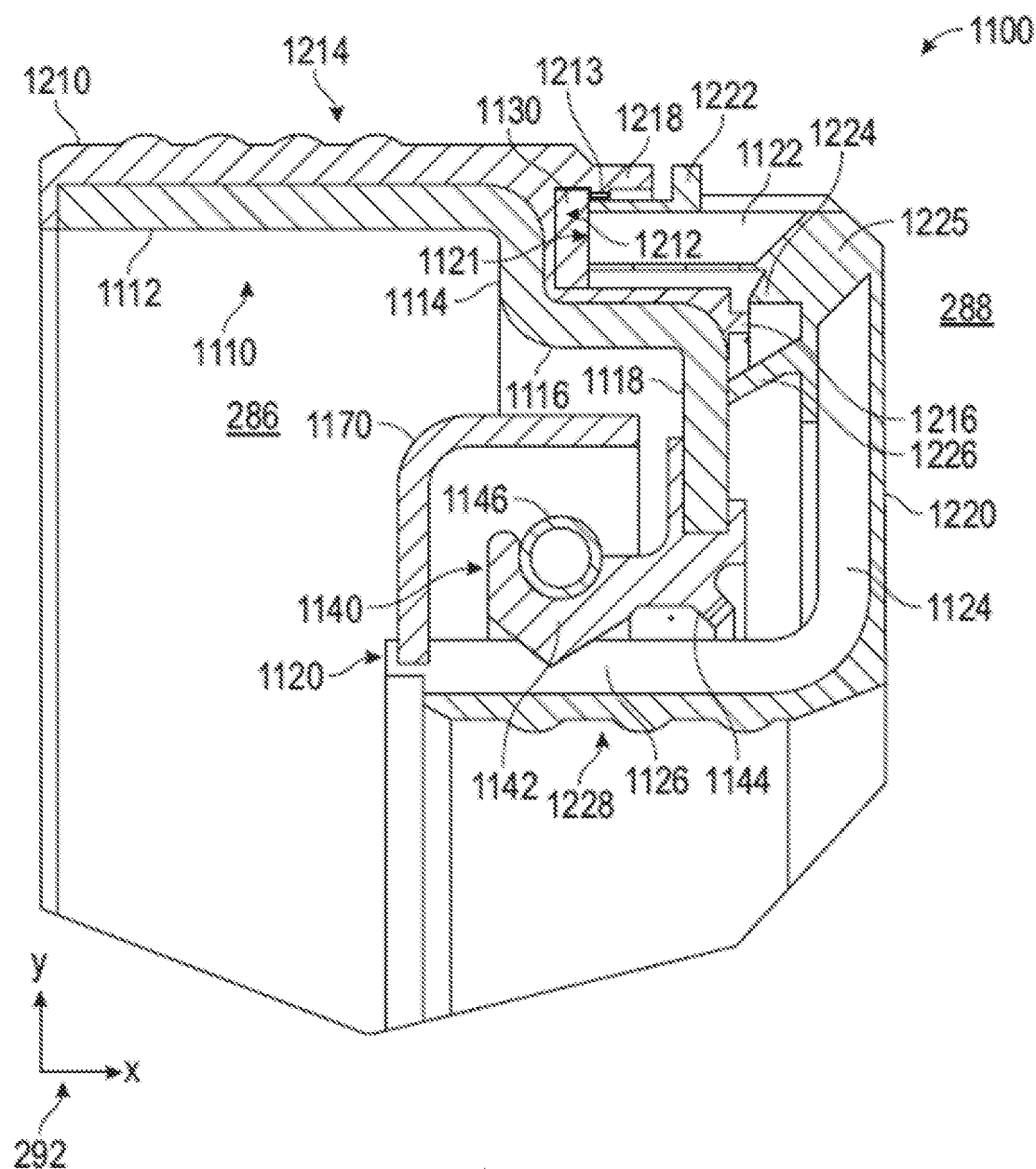

FIGS. 11 and 12 illustrate one bearing seal 1100 having a PTFE thrust bumper 1130 and several over-molded rubber features. FIG. 11 is an isometric cut section view of bearing seal 1100, and FIG. 12 is a cross-sectional view of bearing seal 1100. FIGS. 11 and 12 are best viewed together in the following description. Bearing seal 1100 is an embodiment of bearing seal 1000, and thrust bumper 1130 is an embodiment of thrust bumper 330.

Bearing seal 1100 includes a seal case 1110, a sleeve 1120, thrust bumper 1130, an elastomer 1140, a rubber gasket 1210 over-molded onto seal case 1110, a rubber gasket 1220 over-molded onto sleeve 1120, and a retainer ring 1170. Seal case 1110 includes an outermost axial leg 1112, an axial leg 1116, a radial leg 1114 connecting outermost axial leg 1112 to axial leg 1116, and a radial leg 1118 extending radially inwards from axial leg 1116. Sleeve 1120 includes an innermost axial leg 1126, an outer axial leg 1122, and a radial leg 1124 connecting innermost axial leg 1126 to outer axial leg 1122. Outer axial leg 1121 has a terminal edge 1121 that is butted up against thrust bumper 1130 prior to break-in.

Elastomer 1140 is molded onto radial leg 1118. Elastomer 1140 is an embodiment of elastomer 1040. Elastomer 1140 forms a lip 1142 and a secondary radial lip 1144. Bearing seal 1100 further includes a spring 1146 that helps maintain pressure of lip 1142 onto innermost axial leg 1126. It is noted that FIG. 12 depicts elastomer 1140 in the shape that it has prior to assembly with sleeve 1120. Upon assembly with sleeve 1120, lip 1142 will be pressed radially outwards and likely compressed between innermost axial leg 1126 and spring 1146.

Rubber gasket 1210 includes a receptacle 1212 with a lip 1213. Thrust bumper 1130 is seated in receptacle 1212, and lip 1213 helps secure thrust bumper 1130. Rubber gasket 1220 further includes (a) a ribbed section 1214 configured to engage with a hub, e.g., hub 285, (b) a flange 1218, and (c) an axial lip 1216. Rubber gasket 1220 includes (a) a ribbed section 1228 configured to engage with an axle, e.g., axle 283, (b) a flange 1222 that cooperates with flange 1218 to extend the labyrinth path between seal case 1110 and sleeve 1120, (c) features 1224 and 1226, and (d) a plurality of bridges 1225 passing through a respective plurality of through-holes of sleeve 1120 to connect features 1224 and 1226, on the side of sleeve 1120 facing seal case 1110, with portions of rubber gasket 1220 on the side of sleeve 1120 facing away from seal case 1110. Features 1224 and 1226 cooperate with axial lip 1216 to add complexity to the labyrinth path between seal case 1110 and sleeve 1120 and form a contact seal.

Figure 13A:
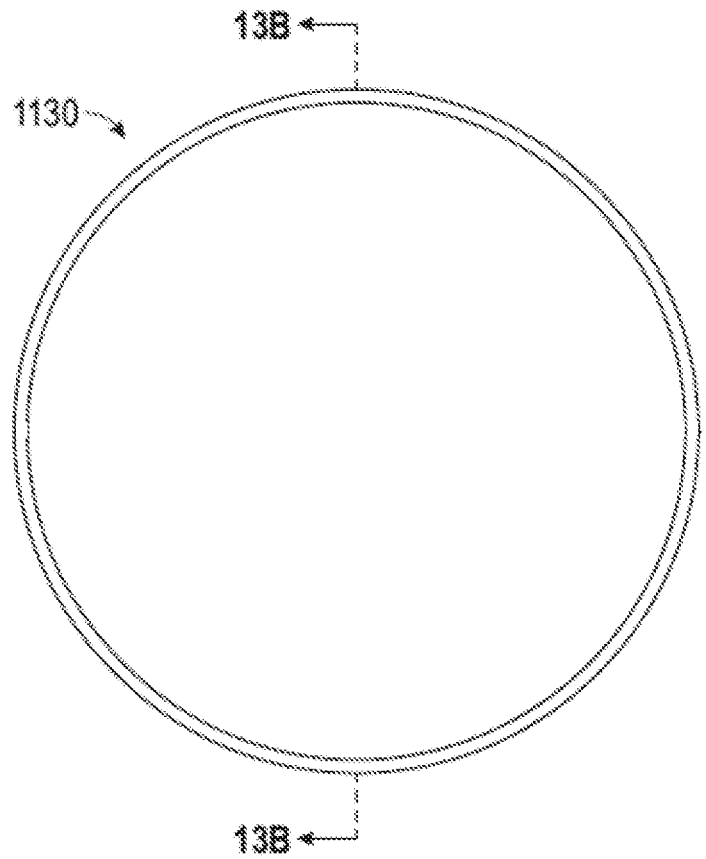
FIGS. 13A, 13B, and 13C show the thrust bumper of FIGS. 11 and 12 in further detail.
Figure 13B:
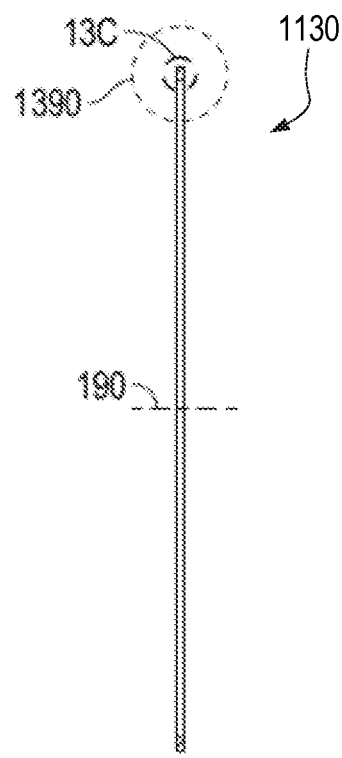
Figure 13C:
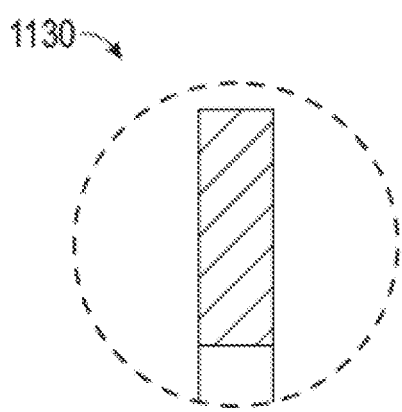

FIGS. 13A, 13B, and 13C illustrate thrust bumper 1130 in further detail. FIGS. 13A and 13B are orthogonal section views of thrust bumper 1130. In FIG. 13A, the section is orthogonal to rotation axis 190. In FIG. 13B, the section is parallel to rotation axis 190. FIG. 13C is a close-up of region 1390 of FIG. 13B.

Test Results—Comparison with Nylon Thrust Bumper and Elastomer

In one set of bench tests, the life of different bearing seals was measured. Four different types of bearing seals were tested: (1) bearing seal 1100 implementing an embodiment of thrust bumper 1130 composed of 100% PTFE, (2) a bearing seal having a nylon 6-6 thrust bumper, (3) another bearing seal having a differently configured nylon 6-6 thrust bumper, and (4) a conventional bearing seal wherein the spacing between the seal case and the sleeve is defined by an elastomer.

Figure 14:
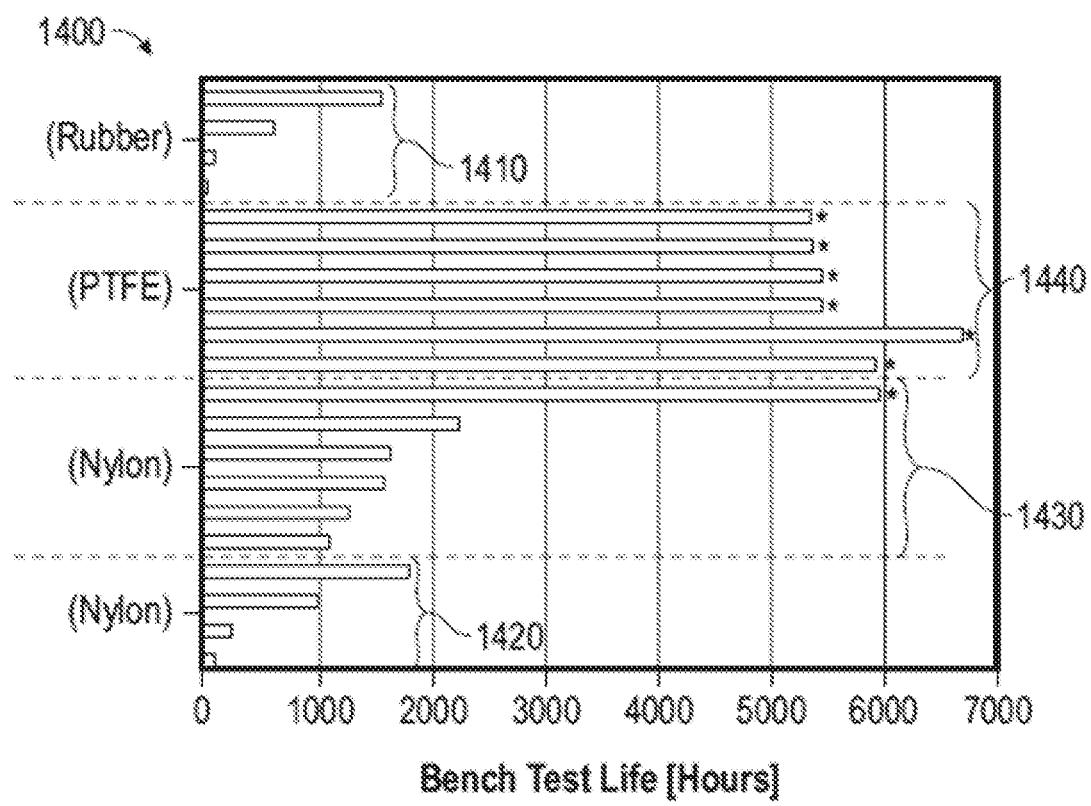
FIG. 14 is a bar graph of the measured life for each of several tested bearing seals.

FIG. 14 is a bar graph of the measured life for each tested bearing seal. Bars marked with an asterisk indicate a snapshot of test durations; at the test duration indicated, these tests were either suspended without failure of the bearing seal or still ongoing without failure. Bars with no asterisk indicate time to failure. Data set 1410 is the results for four conventional bearing seals with an elastomer and no thrust bumper. The measured life spanned from 31 to 1582 hours. All four bearing seals failed, and the average life (time to failure) was 588 hours. Data set 1420 is the results for four bearing seals with a nylon 6-6 bumper. The measured life spanned from 105 to 1828 hours. All four bearing seals failed, and the average life (time to failure) was 803 hours. Data set 1430 is the results for six bearing seals having a nylon 6-6 bumper that is configured differently from the nylon 6-6 bumpers of data set 1420. Data sets 1420 and 1430 pertain to bearing seals where radial lip 1044 does and does not, respectively, bridge across to sleeve 226. Note that one bearing seal did not fail during this test, but the test of this particular bearing seal was suspended at 5965 hours. The remaining five bearing seals did fail, and their life spanned from 1119 to 2272 hours, with an average life of 1594 hours. Thus, even when disregarding the bearing seal that did not fail during the test, the bearing seal type of data set 1430 outperforms the bearing seal types of data sets 1410 and 1420. Data set 1440 is the results for six bearing seals 1100 implementing the pure PTFE thrust bumper 1130. None of these bearing seals failed during the test, even though each of these bearing seals was under test for more than 5000 hours. It is evident from FIG. 14 that bearing seal 1100 presents a dramatic improvement over the bearing seals with a nylon 6-6 thrust bumper, and even more so over the conventional bearing seal with an elastomer spacer.

Figure 15:
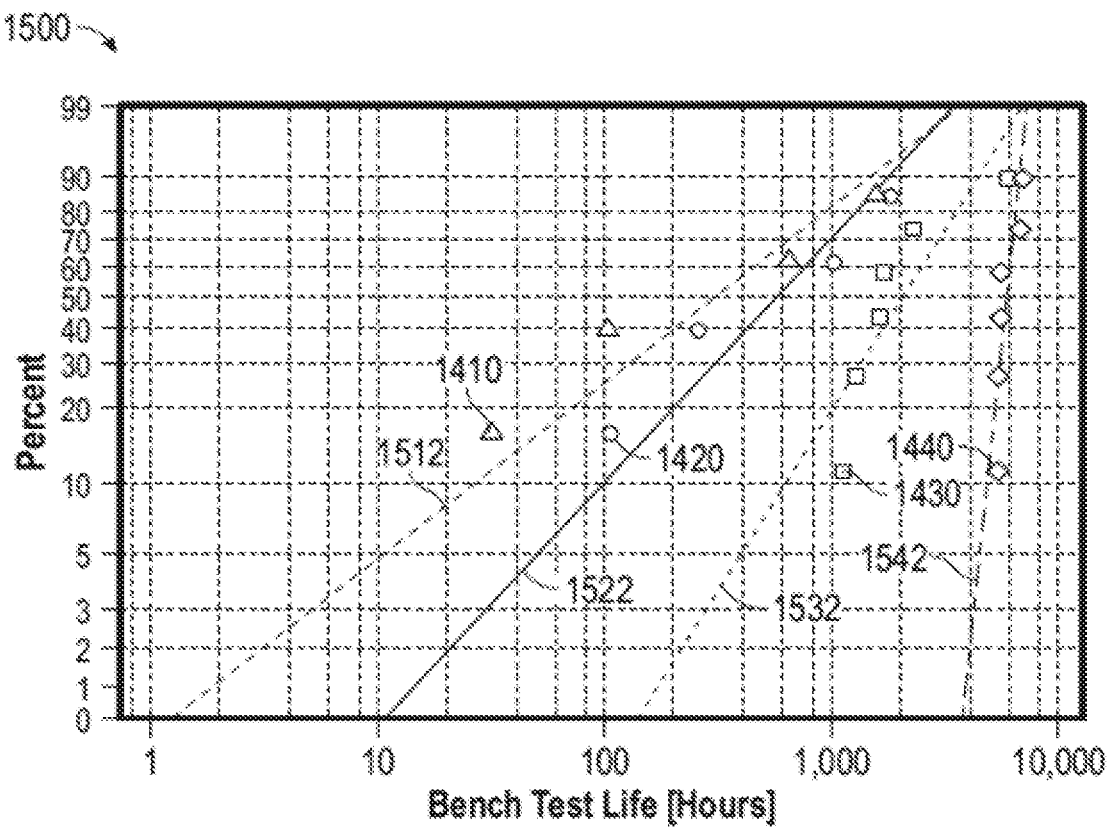
FIG. 15 is a Weibull probability plot of the life measurements graphed in FIG. 14.

FIG. 15 is a Weibull probability plot of the life measurements graphed in FIG. 14. The triangles are the life measurements for data set 1410. Line 1512 is a cumulative Weibull distribution fitted to data set 1410. The shape parameter is 1.06, the scale parameter is 821, and the AD-value (goodness of fit) is 2.965. The circles are the life measurements for data set 1420. Line 1522 is a cumulative Weibull distribution fitted to data set 1420. The shape parameter is 1.57, the scale parameter is 2630, and the AD-value (goodness of fit) is 2.495. The squares are the life measurements for data set 1430 (with the one suspended and non-failing bearing seal represented by the time at which it was suspended). Line 1532 is a cumulative Weibull distribution fitted to data set 1430. The shape parameter is 9.17, the scale parameter is 6227, and the AD-value (goodness of fit) is 2.646. The diamonds are the life measurements for data set 1440, using the time at which the tests were suspended as a conservative estimate of the actual life. Line 1542 is a cumulative Weibull distribution fitted to data set 1440. The shape parameter is 0.77, the scale parameter is 505, and the AD-value (goodness of fit) is 2.952. However, since data set 1440 has no actual life measurements, the primary information that one can derive from FIG. 15 about the performance of bearing seal 1100 with the pure PTFE thrust bumper 1130 is that data set 1440 is to the right of data sets 1410, 1420, and 1430. This shows that bearing seal 1100 with the pure PTFE thrust bumper 1130 outperforms the other bearing seals tested.

Test Results—Comparison of Different PTFE Thrust Bumper Compositions

The effect of the break-in phase on different embodiments of thrust bumper 1130 has been studied in detail. Each embodiment studied has the same shape but a different composition. The compositions are listed below in Table A together with certain material properties: density in units of kilogram per liter (kg/l), tensile strength in units of megapascal (MPa), maximum elongation in units of percent, and hardness on the Shore D hardness scale. In regards to composition, Table A lists the additives, and the remaining portion of the thrust bumper is PTFE. For each composition, two instances of the bearing seal was tested.

TABLE A

| Name | Additive Composition [%] | | | Density [kg/l] | Tensile strength [MPa] | Maximum elongation [%] | Hardness (Shore D) |
|---|---|---|---|---|---|---|---|
| | Carbon fiber | Glass fiber | MoS$_2$ | | | | |
| PTFE A | 10 | 0 | 0 | 0.824 | 18.7 | 210 | |
| PTFE B | 0 | 15 | 5 | 0.780 | 13.9 | 252 | 58.0 |
| PTFE C | 15 | 5 | 0 | 0.700 | 21.0 | 340 | 60.0 |
| PTFE D | 0 | 0 | 0 | 0.800 | 29.6 | 306.4 | 54.0 |

The break-in process consists of several successive periods of operation at up to 850 rpm, with shorter breaks in between. During the break-in process, for each bearing seal tested, we measured the temperature of thrust bumper 1130, as well as the temperature of lip 1142 of elastomer 1140. After the break-in process, each thrust bumper was investigated under a microscope-based profilometer to determine the depth and width of the groove worn in thrust bumper 1130 by terminal edge 1121. The bearing seal was investigated both by eye and under a microscope, to evaluate the presence and properties of debris generated from the wear of thrust bumper 1130. The bearing seals were also monitored for leaks. None of the bearing seals developed leaks during the test.

Table B, below, summarizes certain parameters obtained from our testing: abrasiveness and friction coefficient (each qualitatively evaluated on a relative scale, with "low"<"Moderate"<"Medium"), a wear index, and the peak temperature reached by thrust bumper 1130 during the break-in phase. The wear index is the depth of a groove worn in thrust bumper 1130 by terminal edge 1121 during the break-in phase, averaged over the two instances of the thrust bumper tested. The wear index is similar to depth 710 indicated in FIG. 7.

TABLE B

| Name | Abrasiveness | Friction coefficient | Wear index [millimeters] | Peak Temperature [Fahrenheit] |
|---|---|---|---|---|
| PTFE A | Moderate | Medium | 0.125 | 610 |
| PTFE B | Medium | Moderate | 0.125 | 480 |
| PTFE C | Medium | Medium | 0.105 | 610 |
| PTFE D | Low | Low | 0.475 | 300 |

From Table B, it is clear that pure PTFE thrust bumper, "PTFE D", reaches far lower temperatures than thrust bumpers with additives. The wear index is significantly larger for pure PTFE, which means that a larger gap opens up between the pure PTFE thrust bumper and terminal edge 1121 over the same time span. Yet, the bearing seal did not leak. For all thrust bumpers tested, the peak temperature stayed below the glass transition temperature of PTFE, although the thrust bumpers with carbon fiber additive came close to the glass transition temperature. For each of the "PTFE A", "PTFE B", and "PTFE C" thrust bumpers, the thrust bumper temperature was significantly greater than the temperature of lip 1142. In contrast, for the pure PTFE thrust bumper "PTFE D", the thrust bumper temperature was similar to the temperature of lip 1142.

The debris generated by each of the "PTFE A", "PTFE B", and "PTFE C" thrust bumpers was a very fine black powder with a particle size too fine for the microscope to measure. For the pure PTFE thrust bumper, "PTFE D", the debris was a white flaky substance with a flake size less than 0.003 inches and with thickness too small to be measurable. The flakes tended to cluster and were found to be lubricative.

The flakes did not appear to propagate past the labyrinth formed by axial lip 1216 and features 1214 and 1226, at least not to a measurable extent.

Figure 16:
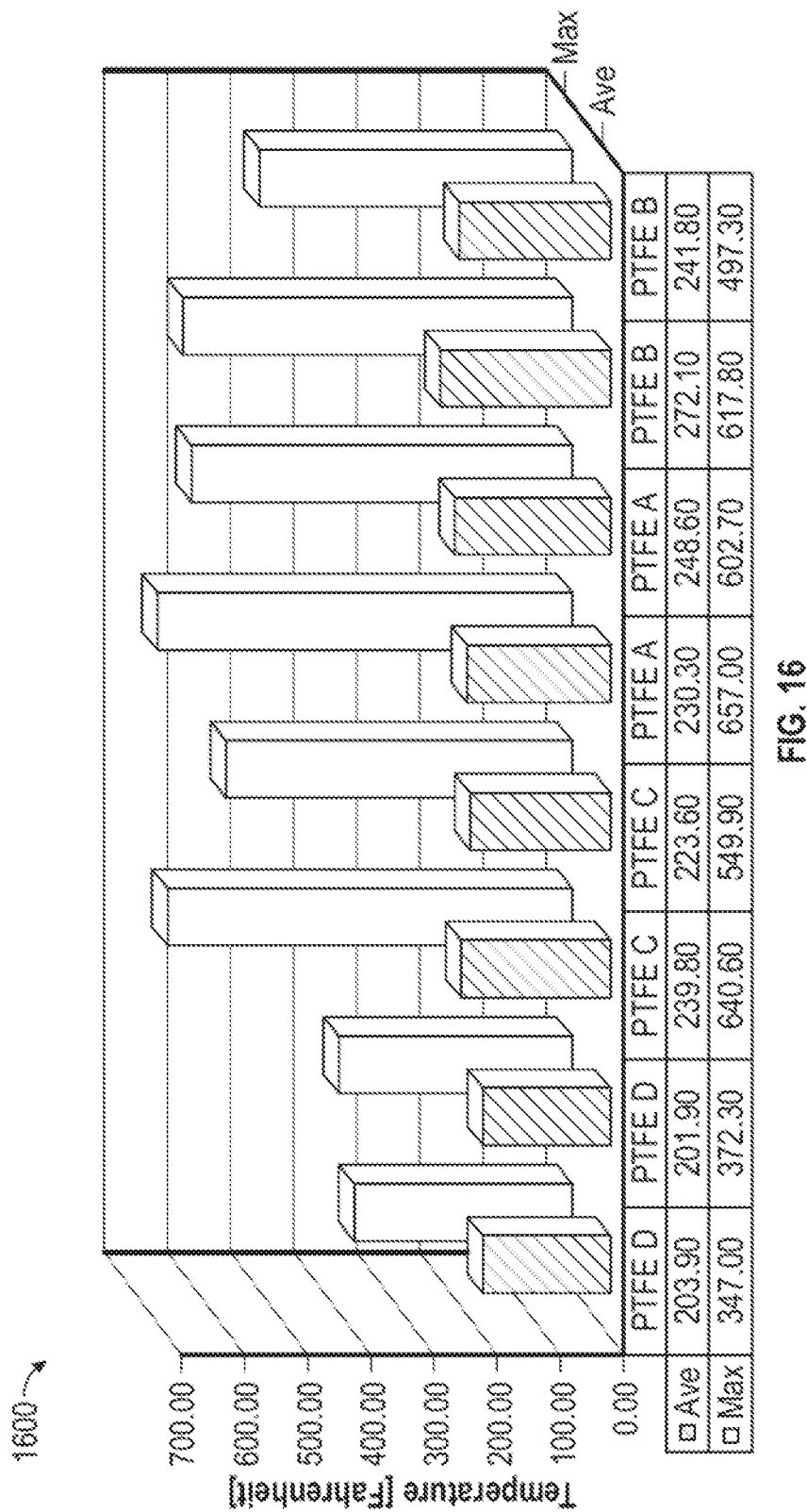
FIG. 16 is a bar graph and table showing the average and maximum temperatures reached by several different compositions of a PTFE thrust bumper during a break-in phase of bearing seals implementing the thrust bumpers.

FIG. 16 is a bar graph and table showing the average temperature (front bars) and maximum temperature (rear bars) reached by the thrust bumper during the break-in phase for each of the thrust bumpers tested. While the average temperature is similar for each of "PTFE A", "PTFE B", "PTFE C", and "PTFE D", the maximum (or peak) temperature is far less for the pure PTFE thrust bumper "PTFE D". Typically, a twenty degree temperature drop will double the life of rubber. Thus, the average temperature reduction by at least 25 degrees for PTFE D is significant.

Figure 17:
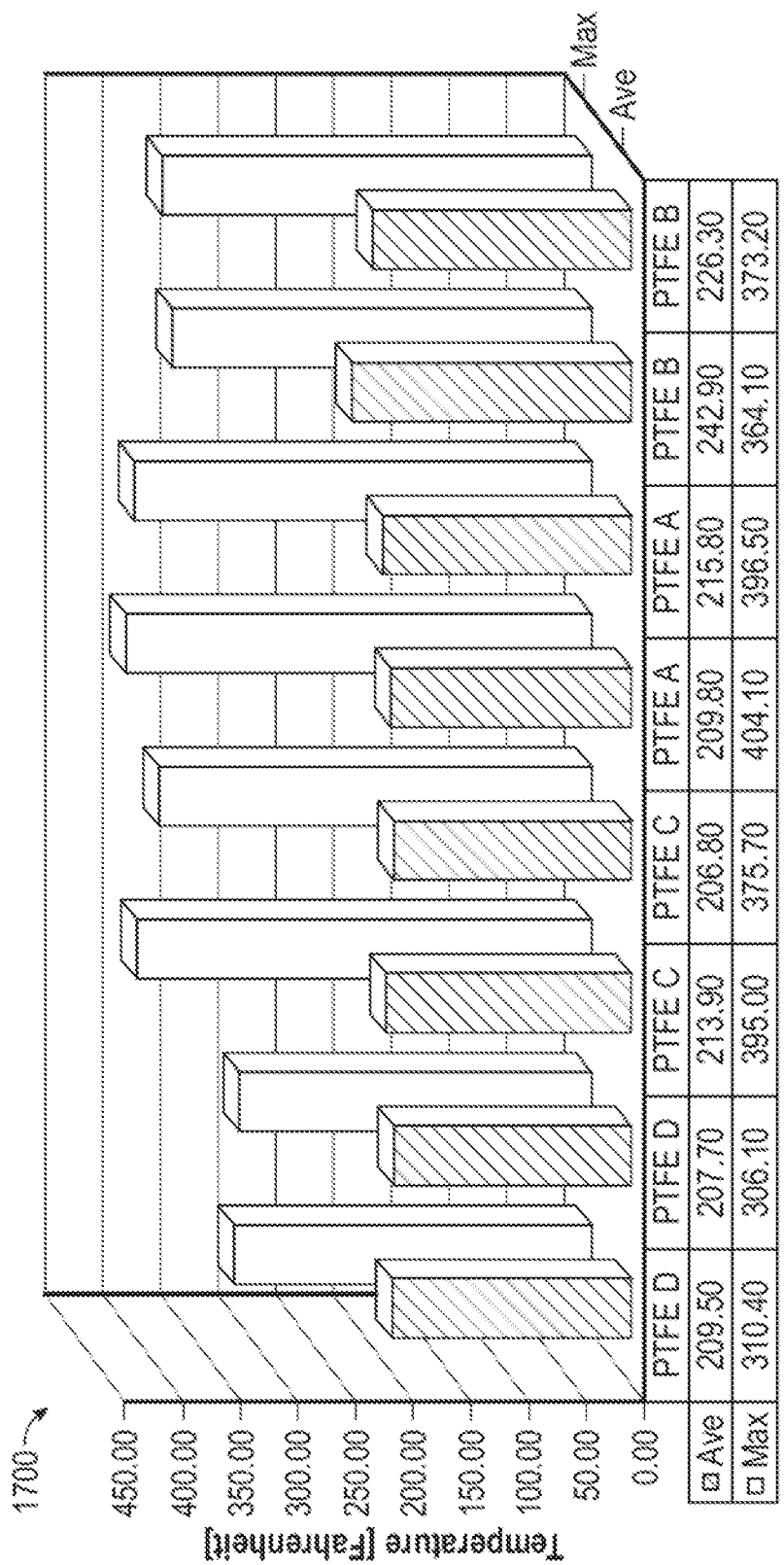
FIG. 17 is a bar graph and table showing the average and maximum temperatures reached, during a break-in phase, by an elastomer lip in a bearing seal implementing a PTFE thrust bumper, for each of a several different compositions of the PTFE thrust bumper.

FIG. 17 is a bar graph and table showing the average temperature (front bars) and maximum temperature (rear bars) reached by lip 1142 during the break-in phase for each of the thrust bumpers tested. Also for lip 1142, the average temperature is similar for each of "PTFE A", "PTFE B", "PTFE C", and "PTFE D". The maximum (or peak) temperature reached by lip 1142 is measurably lower for embodiments with the pure PTFE thrust bumper "PTFE D".

Combinations of Features

Features described above as well as those claimed below may be combined in various ways without departing from the scope hereof. For example, it will be appreciated that aspects of one thrust bumper or bearing seal described herein may incorporate or swap features of another thrust bumper or bearing seal described herein. The following examples illustrate some possible, non-limiting combinations of embodiments described above. It should be clear that many other changes and modifications may be made to the systems herein without departing from the spirit and scope of this invention:

(A1) A bearing seal may include a seal case, a sleeve, and a thrust bumper disposed between the seal case and the sleeve to define spacing between the seal case and the sleeve during assembly of a wheel end implementing the bearing seal, wherein the thrust bumper includes polytetrafluoroethylene.

(A2) In the bearing seal denoted as (A1), the thrust bumper may be composed of a mixture of a plurality of materials, wherein at least eighty weight percent of the mixture is polytetrafluoroethylene.

(A3) In the bearing seal denoted as (A1), the thrust bumper may be composed of a mixture of a plurality of materials, wherein at least ninety weight percent of the mixture is polytetrafluoroethylene (A4) In either of the bearing seals denoted as (A2) and (A3), the mixture may further include at least one additive selected from the group consisting of carbon fiber, graphite, glass fiber, and molybdenum disulfide.

(A5) In the bearing seal denoted as (A4), each additive included in the mixture may contribute at most five weight percent to the mixture.

(A6) In any of the bearing seals denoted as (A2) through (A5), composition of the mixture may be uniform throughout the thrust bumper.

(A7) In the bearing seal denoted as (A1), the thrust bumper may be composed of polytetrafluoroethylene.

(A8) In any of the bearing seals denoted as (A1) through (A7), the thrust bumper may be characterized by at least fifty percent maximum elongation at twenty degrees Celsius.

(A9) In any of the bearing seals denoted as (A1) through (A8), the thrust bumper may be mounted to an axial leg of the seal case, wherein the sleeve includes an inner radial leg, an outer radial leg, and an axial leg connecting the inner radial leg to the outer radial leg, and wherein the outer radial leg terminates in an edge that faces the thrust bumper.

(A10) In the bearing seal denoted as (A9), each of the edge and the thrust bumper may be rotationally symmetric about rotation axis of the bearing seal, radial extent of the edge may be bounded by an inner diameter and an outer diameter, and the thrust bumper may include a planar surface facing the edge, wherein the radial extent of the planar surface includes and exceeds the radial extent of the edge.

(A10) In the bearing seal denoted as (A9), the thrust bumper may have rectangular cross section in a plane that includes the rotation axis.

(A11) Any of the bearing seals denoted as (A1) through (A10) may further include a rubber gasket over-molded on the seal case, wherein the thrust bumper is seated in the rubber gasket.

(B1) A thrust bumper for a bearing seal may include a ring containing polytetrafluoroethylene.

(B2) In the thrust bumper denoted as (B1), the ring may be composed of a mixture of a plurality of materials, wherein at least eighty weight percent of the mixture is polytetrafluoroethylene.

(B3) In the thrust bumper denoted as (B1), the ring may be composed of a mixture of a plurality of materials, wherein at least ninety weight percent of the mixture is polytetrafluoroethylene (B4) In either of the thrust bumpers denoted as (B2) and (B3), the mixture may further include at least one additive selected from the group consisting of carbon fiber, graphite, glass fiber, and molybdenum disulfide.

(B5) In the thrust bumper denoted as (B4), each additive included in the mixture may contribute at most five weight percent to the mixture.

(B6) In any of the thrust bumpers denoted as (B2) through (B5), composition of the mixture may be uniform throughout the ring.

(B7) In the thrust bumper denoted as (B1), the ring may be composed of polytetrafluoroethylene.

(B8) In any of the thrust bumpers denoted as (B1) through (B7), the ring may be characterized by at least fifty percent maximum elongation at twenty degrees Celsius.

(B9) In any of the thrust bumpers denoted as (B1) through (B8), the ring may be characterized by cylindrical symmetry about a cylinder axis encircled by the ring, and the ring may have a planar surface facing along the cylinder axis.

(B10) In the thrust bumper denoted as (B9), the ring may have rectangular cross section in a plane including the cylinder axis.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A bearing seal, comprising:
a seal case affixable to a hub assembly of a wheel end encircling a rotation axis of the bearing seal;
a sleeve affixable to an axle of the wheel end; and
a thrust bumper disposed between the seal case and the sleeve, the thrust bumper having an initial axial thickness that defines a spacing between the seal case and the sleeve when the seal case and the sleeve are compressed together during assembly of the bearing seal, the thrust bumper having a modified axial thickness less than the initial axial thickness after a break-in phase of the bearing seal;
the thrust bumper being composed of a material that is at least 90% polytetrafluoroethylene by weight and includes at least one additive selected from the group consisting of carbon fiber, graphite, glass fiber, and molybdenum disulfide.

2. The bearing seal of claim 1, the material being uniform throughout the thrust bumper.

3. The bearing seal of claim 1, the thrust bumper being characterized by at least fifty percent maximum elongation at twenty degrees Celsius.

4. The bearing seal of claim 1, the thrust bumper being mounted to an axial leg of the seal case, the sleeve including an inner radial leg, an outer radial leg, and an axial leg connecting the inner radial leg to the outer radial leg, the outer radial leg terminating in an edge that faces the thrust bumper.

5. The bearing seal of claim 4, each of the edge and the thrust bumper being rotationally symmetric about the rotation axis, a radial extent of the edge being bounded by an inner diameter and an outer diameter, the thrust bumper including a planar surface facing the edge, a radial extent of the planar surface including and exceeding the radial extent of the edge.

6. The bearing seal of claim 5, the thrust bumper having a rectangular cross section in a plane that includes the rotation axis.

7. The bearing seal of claim 4, further including a rubber gasket over-molded on the seal case, the thrust bumper being seated in the rubber gasket.

8. A method for breaking in a bearing seal, comprising:
rotating a seal case of the bearing seal relative to a sleeve of the bearing seal to create abrasion that reduces an axial thickness of a thrust bumper of the bearing seal;
wherein:
the thrust bumper is disposed between the seal case and the sleeve;
the axial thickness, prior to said rotating, defines a spacing between the seal case and the sleeve;
the thrust bumper is composed of a material that is at least 90% polytetrafluoroethylene by weight; and
the abrasion generates lubricative debris formed from the material that is at least 90% polytetrafluoroethylene by weight.

9. The method of claim 8, wherein:
the thrust bumper is mounted to the seal case; and
said rotating creates abrasion between the sleeve and the thrust bumper.

10. The method of claim 9, wherein the abrasion opens a gap between the sleeve and the thrust bumper.

11. The method of claim 9, wherein:
the thrust bumper is mounted to an axial leg of the seal case;
the sleeve of the bearing seal includes an inner radial leg, an outer radial leg, and an axial leg connecting the inner radial leg to the outer radial leg, the outer radial leg terminating in a sleeve edge that faces the thrust bumper; and
said rotating creates abrasion between the sleeve edge and the thrust bumper.

12. The method of claim 11, wherein:
the sleeve edge and thrust bumper are both rotationally symmetric about a rotation axis of the bearing seal;
the sleeve edge has a radial extent that extends between an inner diameter and an outer diameter;
the thrust bumper has a planar surface facing the sleeve edge, the planar surface having a radial extent that includes and exceeds the radial extent of the sleeve edge; and
said rotating creates abrasion between the sleeve edge and the planar surface of the thrust bumper.

13. The method of claim 8, wherein:
the thrust bumper is mounted to the sleeve; and
said rotating creates abrasion between the seal case and the thrust bumper.

14. The method of claim 13, wherein the abrasion opens a gap between the seal case and the thrust bumper.

15. The method of claim 8, further comprising installing the bearing seal by:
affixing the seal case to a hub assembly of a wheel end; and
affixing the sleeve to an axle of the wheel end.

16. The method of claim 8, further comprising assembling the bearing seal by compressing the seal case and sleeve together with the thrust bumper therebetween.

17. The method of claim 8, wherein the lubricative debris comprises flakes having a flake size less than 0.003 inches.

\* \* \* \* \*